United States Patent [19]
Warnke

[11] Patent Number: 5,244,037
[45] Date of Patent: Sep. 14, 1993

[54] CLOSED LOOP GROUND SOURCE PRESSURIZED SYSTEM FOR A HEAT PUMP

[76] Inventor: Dallas H. Warnke, 1110 Lincoln St., Scranton, Iowa 51462

[21] Appl. No.: 856,187

[22] Filed: Mar. 23, 1992

[51] Int. Cl.$^5$ .......................... F25D 17/02; F24J 3/08
[52] U.S. Cl. .................. 165/104.31; 165/45; 165/104.19; 62/238.7; 62/260; 237/66; 137/565
[58] Field of Search ............... 62/260, 238.7; 165/45, 165/104.19, 104.31, 104.32; 126/422, 437; 237/66; 137/565

[56] References Cited

U.S. PATENT DOCUMENTS

| | | | |
|---|---|---|---|
| 2,190,060 | 2/1940 | Fager | 137/565 |
| 4,246,886 | 1/1981 | Sitzlar | 126/422 |
| 4,909,312 | 3/1990 | Biedenbach et al. | 237/66 |
| 4,911,229 | 3/1990 | McElroy | 62/238.6 |

Primary Examiner—Albert W. Davis, Jr.
Attorney, Agent, or Firm—Lundy & Associates

[57] ABSTRACT

A closed loop, pressurized system for a ground source heat pump and a pressure/liquid source module therefore. The pressure/liquid source module has a liquid tank having a predetermined liquid level and an inlet pipe extending downwardly within the tank from adjacent the top of the tank to a distal end which is below the liquid level. The inlet pipe is adapted to be connected to the loop of the closed loop, pressurized system of the heat pump. The liquid tank has an outlet adjacent the bottom of the tank, the outlet being connected to the heat pump through a check valve and a liquid pump. The valve is between the tank and the pump.

11 Claims, 1 Drawing Sheet

CLOSED LOOP GROUND SOURCE PRESSURIZED SYSTEM FOR A HEAT PUMP

BACKGROUND OF THE INVENTION

The present invention pertains to a pressurized, closed loop, ground source, liquid system for a heat pump, and more particularly to a closed loop pressurized system having a pressure/liquid source module for a pressurized, closed earth loop, heat pump system.

Heat pumps have long been a source for heating and cooling both commercial and domestic buildings. Restrictions for such systems in many locations require a pressurized, closed loop, ground source system rather than an open loop system in which ground water is removed from the ground used by the heat pump as either a heat source or a heat reservoir and returned to the ground.

Pressurized, closed loop, ground source systems for heat pumps in the past have had several inherent problems. Most pressurized, closed loop systems for heat pumps utilize a fluid other than water to retard freezing and corrosion, increase heat transfer or otherwise enhance the system. Therefore, such systems usually are isolated from any liquid source and do not have any liquid reservoir from which liquid deficiencies can be replenished. Similarly, while most of these systems are preferably pressurized, most of these systems do not have any independent pressure source. In fact, the only pressure source available to the system is the pump which circulates the liquid through the loop. Therefore, it is normal experience that when liquid is withdrawn from the system for temperature tests, pH tests, and/or pressure tests, systems lose pressure and lose liquid or gain air which ultimately results in down time of the system.

It is therefore highly desirable to provide an improved closed loop, ground source, pressurized system for a heat pump.

It is also highly desirable to provide an improved closed loop, ground source, pressurized system for a heat pump having a liquid/pressure source module.

It is also highly desirable to provide an improved closed loop, ground source, pressurized system for a heat pump which provides both pressure and liquid to fill and purge air from the system.

It is also highly desirable to provide an improved closed loop, ground source, pressurized system for a heat pump from which no pressure is lost and no liquid is lost from the loop when pressure tests, temperature tests, and pH tests are taken.

It is also highly desirable to provide an improved closed loop, ground source, pressurized system for a heat pump which minimizes down time and the necessity for service.

It is also highly desirable to provide an improved closed loop, ground source, pressurized system for a heat pump which has a pressure/liquid source module plumbed into the loop as desired without the necessity of flex-type connections.

It is finally highly desirable to provide an improved closed loop, ground source pressurized system for a heat pump which meets all of the above desired features.

SUMMARY OF THE INVENTION

It is therefore an object of the invention to provide an improved closed loop, ground source, pressurized system for a heat pump.

It is also an object of the invention to provide an improved closed loop, ground source, pressurized system for a heat pump having a liquid/pressure source module.

It is another object of the invention to provide an improved closed loop, ground source, pressurized system for a heat pump which provides both pressure and liquid to fill and purge air from the system.

It is another object of the invention to provide an improved closed loop, ground source, pressurized system for a heat pump from which no pressure is lost and no liquid is lost from the loop when pressure tests, temperature tests, and pH tests are taken.

It is another object of the invention to provide an improved closed loop, ground source, pressurized system for a heat pump which minimizes down time and the necessity for service.

It is another object of the invention to provide an improved closed loop, ground source, pressurized system for a heat pump which has a pressure/liquid source module plumbed into the loop as desired without the necessity of flex-type connections.

It is finally an object of the invention to provide an improved closed loop, ground source, pressurized system for a heat pump which meets all of the above desired features.

In the broader aspects of the invention there is provided a closed loop, pressurized system for a ground source heat pump and a pressure/liquid source module therefore. The pressure/liquid source module has a liquid tank having a predetermined liquid level and an inlet pipe extending downwardly within the tank from adjacent the top of the tank to a distal end which is below the liquid level. The inlet pipe is adapted to be connected to the loop of the closed loop, pressurized system of the heat pump. The liquid tank has an outlet adjacent the bottom of the tank, the outlet being connected to the heat pump through a check valve and a liquid pump. The valve is between the tank and the pump.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
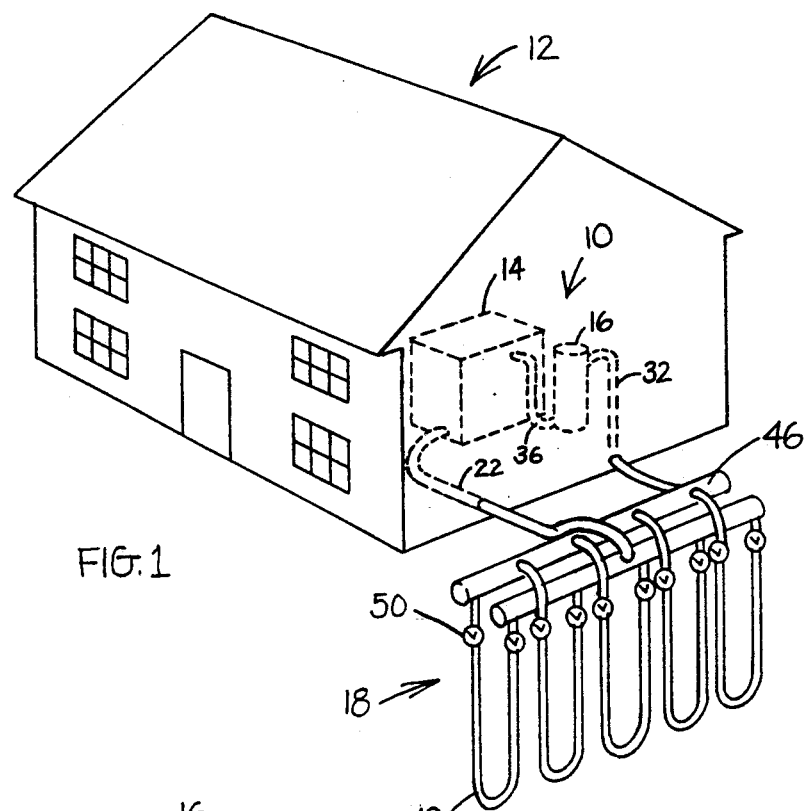
FIG. 1 shows a closed loop, pressurized system with the pressure/liquid module of the invention and a heat pump as installed in a home.

The improved closed loop, pressurized system for a heat pump of the invention is shown fully installed in FIG. 1. The system 10 is installed in a conventional home 12. The system 10 includes a heat pump 14, a pressure/liquid source module 16 and a ground source, closed loop system 18. The heat pump 14 can be of any number of commercially available heat pumps. Each of these heat pumps have a liquid inlet 20 and a liquid outlet 22. The liquid outlet 22 is connected to the closed loop system 18. The liquid inlet 20 receives liquid from the closed loop system 18.

Figure 2:
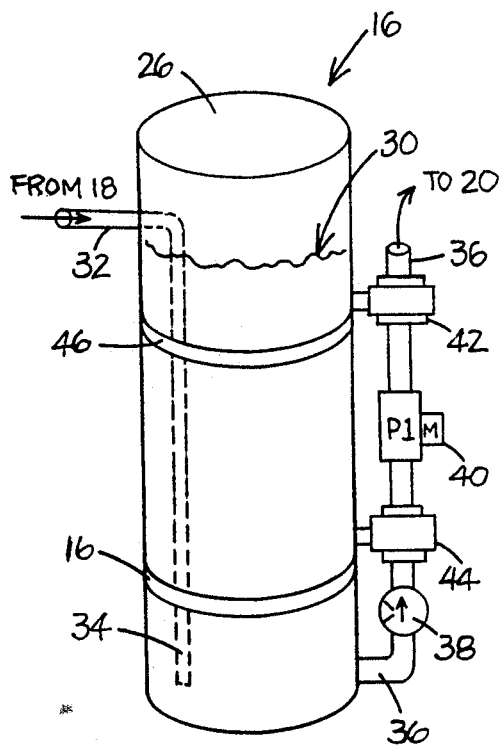
FIG. 2 illustrates the pressure/liquid source module of the invention.

Referring now to FIG. 2, the pressure/liquid source module 16 is illustrated. Module 16 includes a tank 24 having a top 26 and a bottom 28. Tank 24 has a predetermined liquid level 30 and an inlet pipe 32 which extends downwardly within tank 24. Inlet pipe 32 has a distal end 34 which is below liquid level 30. Tank 24 has an outlet pipe 36 in which is mounted a check valve 38, a motor pump combination 40, a pair of valves 42, 44 mounted on opposite sides of pump 40 and an outlet conduit 38 which connects module 16 to the inlet 20 of heat pump 14. In the specific embodiment illustrated, the check valve 38, pump motor 40, valves 42, 44 are all mounted so as to extend vertically of the tank 24 and are secured to the tank by metal bands 46. In this embodiment, the tank 24, the check valve 38, the motor 40 and its associated valves 42, 44 all comprise a self-contained, pressure/liquid source module which can be installed in any existing heat pump installation. In other embodiments, the valves 38, 42, 44 and the pump 40 can all be installed in the line 36, 38 between the tank 24 and the heat pump 14. There is no need to locate the module 16 at any specific location so long as it is between the heat pump 14 and the closed loop system 18. There is never a need with the pressure/liquid source module of the invention to utilize flexible connectors.

The closed loop system 18 includes a manifold 46 and at least one closed loop 48. Each of the closed loops 48 require at least one gate valve 50 therein to isolate the loop when necessary. In most embodiments, and of the embodiment illustrated in FIG. 1, there are a plurality of closed loops 48 all connected to manifold 46 which in turn is connected between heat pump 14 and module 16. In each specific embodiment, the design of the heat pump 14 including its capacity and the length of loop 48, dictate the number of loops.

Figure 3:
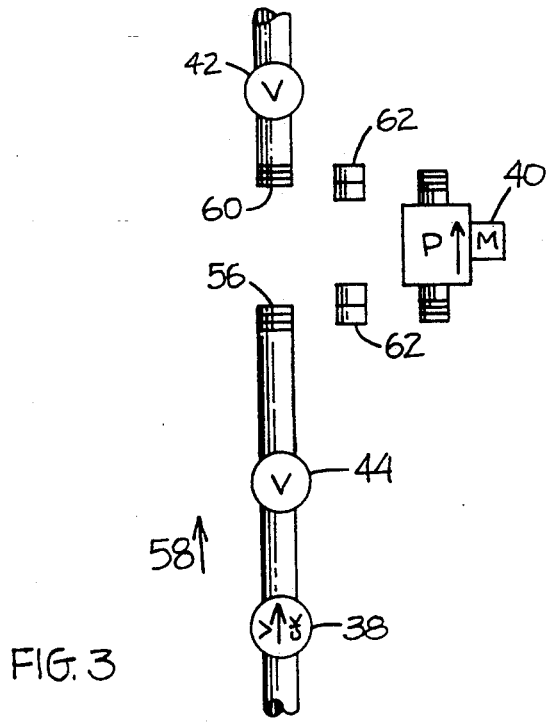
FIG. 3 illustrates the valving and the pump and the innerconnections existing between the pressure/liquid source module and the heat pump as shown in FIG. 2.

Referring now to FIG. 3, the particular valves 42, 44 and pump/motor 40 is illustrated. Valve 44 can be manually opened or closed. Normally, valves 42 and 44 are open. When valve 44 is closed, no fluid flows from the outlet 56 of the valve 44. Check valve 38 is a standard check valve which allows flow in the direction of the arrow 58 through the check valve to occur, but when the pump 40 is not running, no fluid flows in the direction opposite arrow 58 through pipe 36.

Valve 42 is similar to valve 44 having an inlet 60, an outlet 56, a ball 52, and a valve seat 54. Valve 42 does not function in conjunction with check valve 38, instead, valve 42 is manually opened or closed, as desired. Valve 42 is normally open. Valve 42 is closed to prevent fluid from flowing from inlet 60 when pump 40 is removed from pipe 36 for service or replacement.

Inlet 60 and outlet 56 of valves 42, 44 each have exterior threads thereon by which couplings can be used to couple the pump 40 therebetween. In a specific embodiment, pump 40 can be a standard pump. One such pump is the Grunfoss Model 2699F pump having an output of up to 20 GPM.

In operation, pump 14, pressure/liquid source module 16 and ground source, closed loop system 18 are connected together as shown in FIG. 1. As installed, pipes 34, 36, 38, loops 48 and all connecting pipes are full of liquid under pressure. The only air in the system is that above liquid level 30 in tank 24. Closed loop, pressurized system 10 functions as any other heat pump system in both an air conditioning mode and a heating mode by which heat is transferred to the ground through the closed loop system 18 and is returned to the heat pump 14 for heating or cooling the home 12.

The pressure/liquid source module 16 of the closed loop, pressurized heat pump system 10 of the invention allows for each of the loops to be filled with pressurized liquid and exhausted of air individually during installation and subsequent service. Each of the loops 48 can be isolated by valves 50 and the pump 40 run so as to exhaust any air in the system to the space above the liquid level 30 in tank 24. Tank 24 has sufficient capacity to replace the volume of any air exhausted by the liquid within the tank. Successively, each of the loops 48 is isolated, the pump run and the loops exhausted of air and filled with pressurized liquid during this procedure. Similarly, liquid can be bled from the system to conduct pressure tests, temperature tests, and pH tests as is conventional. The loss of liquid will be replenished by the liquid within the tank 24 and no pressure loss will occur.

The pump 40, which from time to time wears out and needs replacement or service can be completely removed from the pressure/liquid source module again without losing pressure or liquid from the module as shown in FIG. 3. Pump 40 is merely disengaged from the couplings 62 after closing valves 42 and 44 and replaced or serviced as needed. When the pump is removed, valves 42, 44 prevents any liquid and any pressure to leak from the system.

The improved closed loop, pressurized system for a heat pump of the invention includes an improved self-contained, pressure/liquid source module by which no outside pressure or liquid source is required for installation or pressure, temperature, or pH testing. When pressure, temperature and pH tests are conducted, no loss of pressure occurs and down time of the system is essentially eliminated. The improved closed loop, pressurized system of the invention provides sufficient pressure and liquid to fill the system and purge oxygen from the system. The system requires less labor upon installation and less service time. The system can be installed as a permanent installation without any flex-type connections and the liquid/pressure module can be placed anywhere within the system without placement restrictions.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto.

What is claimed is:

1. A closed loop pressurized system for a heat pump comprising at least one loop connected to a heat pump return line, a non-pressurized liquid tank having a predetermined liquid level and an inlet pipe extending downwardly within said tank from adjacent the top of the tank, said inlet pipe being connected between said loop and said heat pump, said inlet pipe having an outlet below the liquid level of said tank, said tank having an outlet adjacent the bottom of said tank, said outlets being spaced apart, said tank outlet being connected to said heat pump having a normal outlet pressure of about 15 PSIG through a check valve and a pump, said check valve being between said tank and said pump.

2. The system of claim 1 wherein said at least one loop is a plurality of loops, said plurality of loops being each connected to said heat pump in parallel.

3. The system of claim 2 wherein each of said loops having at least one valve connected therein, each said valve when closed isolating its loop from the other ones of said plurality of loops.

4. The system of claim 1 wherein said loop and all connections between said loop and tank and heat pump are filled with liquid, said tank has a lower portion filled with liquid and an upper portion filled with air, and said loop and tank and connections all being at essentially the same pressure.

5. The system of claim 1 wherein on both sides of said pump is a coupling and a ball valve, said couplings being between said pump and said ball valve, one of said couplings and ball valves being between said loop and said check valve.

6. The system of claim 1 wherein said tank is elongated having the top farther away from the bottom than any transverse dimension of said tank.

7. The system of claim 6 wherein on both sides of said pump is a coupling and a ball valve, said couplings being between said pump and said ball valves, one of said couplings and ball valves being between said loop and said check valve, and said pump and couplings and said valves are extended vertically of said tank and attached to said tank.

8. The system of claim 3 wherein said loop and all connections between said loop and tank and heat pump are filled with liquid, said tank has a lower portion filled with liquid and an upper portion filled with air, and said loop and tank and connections all being at essentially the same pressure.

9. The system of claim 8 wherein said tank is elongated having the top farther away from the bottom than any transverse dimension of said tank.

10. The system of claim 9 wherein on both sides of said pump is a coupling and a ball valve, said couplings being between said pump and said ball valves, one of said couplings and ball valves being between said loop and said check valve, and said pump and couplings and said valve are extended vertically of said tank and attached to said tank.

11. A closed loop pressurized system for a heat pump comprising at least one loop connected to a heat pump return line, a non-pressurized liquid tank having a predetermined liquid level and an inlet pipe extending downwardly within said tank from adjacent the top of the tank, said inlet pipe being connected to said heat pump through said loop, said inlet pipe having an outlet below the liquid level of said tank, said tank having an outlet adjacent the bottom of said tank, said inlet and outlet being spaced apart, said outlet being connected to said heat pump through a check valve and a pump having a normal outlet pressure of about 15 PSIG, said check valve being between said tank and said pump, said loop and all connections between said loop and tank and heat pump are filled with liquid, said tank has a lower portion filled with liquid and an upper portion filled with air, and said loop and tank and connections all being at essentially the same pressure, a pair of couplings on opposite sides of said pump respectively, one of said couplings being between said pump and said check valve, one of said couplings being between pump and said heat pump, said tank being elongated having the top further away from the bottom than any transverse dimension of said tank, said pump and couplings and said check valve are extended vertically of said tank and attached to said tank thereby forming a liquid/pressure source module.

* * * * *